UNITED STATES PATENT OFFICE.

GEORG KALISCHER, OF MAINKUR, NEAR FRANKFORT-ON-THE-MAIN, GERMANY.

ANTHRAQUINONE DERIVATIVE AND PROCESS OF MAKING SAME.

1,285,726. Specification of Letters Patent. Patented Nov. 26, 1918.

No Drawing. Application filed February 25, 1916, Serial No. 80,395. Renewed April 30, 1918. Serial No. 231,745.

*To all whom it may concern:*

Be it known that I, GEORG KALISCHER, Ph. D., a subject of the King of Prussia, residing at Waldstrasse 23, Mainkur, near Frankfort-on-the-Main, Germany, have invented a certain New Anthraquinone Derivative and Process of Making Same, of which the following is a full description.

I have discovered that when heating 1-amino-2-methylanthraquinone with aromatic nitro compounds in presence of alkalis to elevated temperatures, intensely colored products of condensation are obtained. The reaction takes place while water is split off, probably in such a manner that the methyl group of the 1-amino-2-methylanthraquinone is oxidized by the nitro compound used; at the same time a condensation of the two molecules takes place. Perfectly analogous compounds are obtained if the reaction is carried out in the presence of primary aromatic amins. In this case the used nitro compound acts as an oxidizing agent, whereas the used amins immediately form condensation products with the 1-amino-2-methylanthraquinone oxidized by the nitro compound; these condensation products, according to their behavior, possess a constitution absolutely analogous to that of the condensation products produced by means of nitro compounds alone. Consequently when using the amin corresponding to the nitro compound used, the same compound is obtained as when using the nitro compound alone.

I have further discovered that the condensation products thus obtained are split by the reaction of acids, and that they one and all yield the same derivative of anthraquinone, which according to its properties and according to the result of the analysis, must be considered as 1-aminoanthraquinone-2-aldehyde, of the following formula

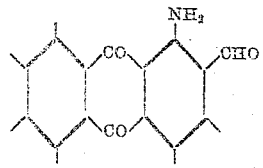

As besides this compound, only the formation of those amins (or the amins corresponding with the nitro compounds used) may be proved which have been used for the production of the respective products of condensation, it must be presumed that these products of condensation are azomethin compounds of the following formula

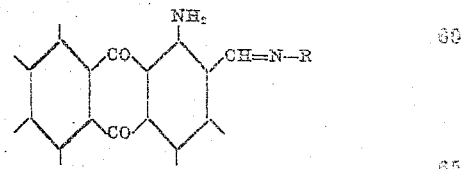

(where R represents any aromatic group).

The process of working is illustrated by the following examples:

Example 1: To a solution of 10 kilos 1-amino-2-methylanthraquinone and 60 kilos nitrobenzene, 5 kilos carbonate of potash are added and the mixture is kept boiling for 6 hours. From the intense bluish red solution, when filtered hot, the new product of condensation separates on cooling. By crystallizing from nitrobenzene it is obtained in brilliant red crystals with a melting point of 212° C. The compound dissolves in organic solvents of a high boiling point with a bluish red color. In concentrated sulfuric acid it yields a yellow solution which on addition of paraformaldehyde is changed into a blue color. With hydrosulfite and caustic soda lye, an intense green vat is obtained, which dyes cotton the same green shade; on washing, this shade turns first into blue and finally into a red.

Example 2: A mixture of 10 kilos 1-amino-2-methylanthraquinone, 20 kilos m-nitranilin, 40 kilos naphthalene and 5 kilos carbonate of potash is heated for 6 hours to about 230° C. (exterior temperature). The whole mixture is diluted with naphtha and filtered hot. When cold, the separated product of condensation is filtered off. The product thus obtained dissolves in concentrated sulfuric acid with an olive brown color, which on addition of paraformaldehyde is changed into a greenish blue. When dissolved with hydrosulfite and caustic soda lye, it yields a green vat which dyes cotton claret red shades.

Example 3: To a solution of 10 kilos 1-amino-2-methylanthraquinone and 70 kilos nitrobenzene, 5 kilos anilin and 5 kilos melted acetate of potash are added, and the whole mixture is boiled for 6 hours. The solution is filtered hot, and on cooling same, a compound separates in brilliant red crystals which, as is confirmed by its reactions and the melting point, is identical with the compound obtained when working according to Example 1. The same compound results if the carbonate of potash used is substituted by 1 kilo caustic soda.

Example 4: 10 kilos 1-amino-2-methylanthraquinone, 8 kilos betanaphthylamin, 5 kilos carbonate of potash and 60 kilos nitrobenzene are heated for 6 hours to about 225° C. (exterior temperature). On cooling the hotly filtered solution, the new compound separates. It dissolves in concentrated sulfuric acid with an orange red color which on addition of paraformaldehyde is changed into a bluish green. With hydrosulfite and caustic soda lye a green vat is formed which dyes cotton claret red shades.

Example 5: 10 kilos of the product of condensation obtained when working according to Example 1 are boiled for ½ hour with 200 kilos glacial acetic acid and 20 kilos hydrochloric acid of 20° Bé. The 1-aminoanthraquinone-2-aldehyde which has separated is filtered off after cooling. The corresponding quantity of anilin is to be found in the filtrate. By crystallization from nitrobenzene, the 1-aminoanthraquinone-2-aldehyde is obtained in the form of crystals with a metallic luster, melting at about 233° C. It is very difficultly soluble in alcohol, soluble in organic solvents of a high boiling point. It dissolves in concentrated sulfuric acid with a brown color which on addition of paraformaldehyde is changed immediately into an intense blue. With hydrosulfite and caustic soda lye a bright green vat is formed which dyes cotton but very slightly.

Example 6: 10 kilos of the product of condensation obtained when working according to Example 4 are dissolved at about 30° C. in 100 kilos concentrated sulfuric acid. 20 kilos water are then added gradually to the orange red solution, seeing that the temperature does not exceed 90° C. After half an hour's stirring, the mixture of the reaction is poured into water whereby the 1-aminoanthraquinone-2-aldehyde separates in the shape of yellowish red flakes which are isolated in the usual manner. The compound perfectly corresponds in properties with the compound obtained when working according to Example 5, whereas the corresponding quantity of betanaphthylamin is to be found in the filtrate.

Having now particularly described and ascertained the nature of my said invention, and in what manner the same is to be performed, I declare that what I claim is:

1. The process of producing 1-aminoanthraquinone-2-aldehyde of the following formula

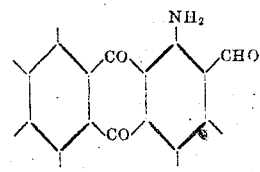

by treating with acids the products of condensation of the general formula:

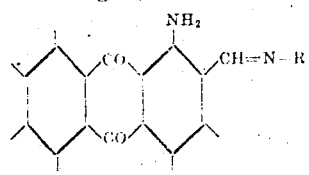

(where R represents any aromatic group), which are obtained by heating 1-amino-2-methylanthraquinone with aromatic nitro compounds in the presence of alkalis, the 1-aminoanthraquinone-2-aldehyde thus obtained crystallizing in crystals with a metallic luster, melting at about 233° C., dissolving in concentrated sulfuric acid with a brown color, which on addition of paraformaldehyde changes to an intense blue, yielding with hydrosulfite and caustic soda lye a bright green vat, substantially as described.

2. The process of producing 1-aminoanthraquinone-2-aldehyde of the following formula

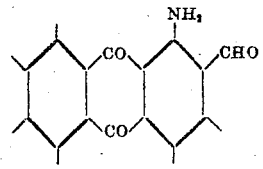

by treating with acids the products of condensation of the general formula:

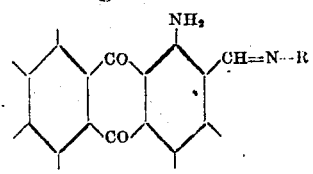

(where R represents any aromatic group), which are obtained by heating 1-amino-2-methylanthraquinone with aromatic nitro compounds with the addition of primary aromatic amins in the presence of alkalis, the 1-aminoanthraquinone-2-aldehyde thus obtained crystallizing in crystals with a metallic luster, melting at about 233° C., dissolving in concentrated sulfuric acid with a brown color, which on addition of paraformaldehyde changes to an intense blue, yielding with hydrosulfite and caustic soda lye a bright green vat, substantially as described.

3. The herein described new 1-aminoanthraquinone-2-aldehyde of the following formula:

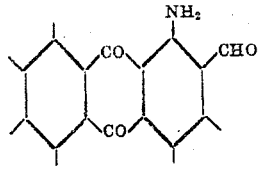

crystallizing in crystals with a metallic luster, melting at about 233° C., dissolving in concentrated sulfuric acid with a brown color, which on addition of paraformaldehyde is changed into blue, yielding with hydrosulfite and caustic soda lye a bright green vat, substantially as described.

In witness whereof I have hereunto signed my name this 26th day of January, 1916, in the presence of two subscribing witnesses.

Dr. GEORG KALISCHER.

Witnesses:
 JEAN GRUND,
 HARRY E. CARLSON.